(12) United States Patent
Naidu et al.

(10) Patent No.: US 7,474,786 B2
(45) Date of Patent: Jan. 6, 2009

(54) METHOD OF AND SYSTEM FOR CLASSIFYING OBJECTS USING HISTOGRAM SEGMENT FEATURES OF MULTI-ENERGY COMPUTED TOMOGRAPHY IMAGES

(75) Inventors: Ram Naidu, Waban, MA (US); Zhengrong Ying, Wakefield, MA (US); Sergey Simanovsky, Brookline, MA (US); Matthew Hirsch, Cambridge, MA (US); Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 705 days.

(21) Appl. No.: 11/198,360

(22) Filed: Aug. 4, 2005

(65) Prior Publication Data

US 2007/0031036 A1    Feb. 8, 2007

(51) Int. Cl.
*G06K 9/00* (2006.01)
(52) U.S. Cl. .................................... 382/168
(58) Field of Classification Search ................. 382/100, 382/168, 170–172, 199; 705/13; 378/4–5, 378/14–15, 20, 53, 57–58, 62, 69, 86–89, 378/98.8, 101, 105, 145
See application file for complete search history.

(56) References Cited

U.S. PATENT DOCUMENTS

| | | | |
|---|---|---|---|
| 4,029,963 A | 6/1977 | Alvarez et al. | 250/360 |
| 4,759,047 A | 7/1988 | Donges et al. | 378/57 |
| 4,884,289 A | 11/1989 | Glockmann et al. | 378/57 |
| 5,132,988 A | 7/1992 | Fisher et al. | 375/11 |
| 5,132,998 A | 7/1992 | Tsutsui et al. | 378/99 |
| 5,182,764 A | 1/1993 | Peschmann et al. | 378/57 |
| 5,247,561 A | 9/1993 | Kotowski | 378/87 |
| 5,319,547 A | 6/1994 | Krug et al. | 364/409 |
| 5,367,552 A | 11/1994 | Peschmann | 378/57 |
| 5,473,657 A | 12/1995 | McKenna | 378/4 |
| 5,490,218 A | 2/1996 | Krug et al. | 382/100 |
| 5,661,774 A | 8/1997 | Gordon et al. | 378/101 |

FOREIGN PATENT DOCUMENTS

DE    3150303 A1    12/1981
WO   WO96/13017    5/1996

OTHER PUBLICATIONS

Alvarez, R. E., et al., "Energy -selective Reconstruction ni X-ray Computerized Tomography", Phys. Med. Biol. 1976, vol. 21, No. 5, 733-744.
Lehmann, L. A., et al., "Generalized Image Combinations In Dual KVP Digital Radiography", Med. Phys. 8, 659-667 (1981).
Chuang K., et al., "A Fast Dual-Energy Computational Method Using Isotransmission Lines and Tables", Med. Phys. 14, 186-192 (1987).

*Primary Examiner*—Jose L Couso
(74) *Attorney, Agent, or Firm*—McDermott Will & Emery LLP

(57) ABSTRACT

A method of and a system for identifying objects using histogram segment features from multi-energy CT images are provided. The multi-energy CT images include a CT image, which approximates density measurements of scanned objects, and a Z image, which approximates effective atomic number measurements of scanned objects. The method comprises: computing a density histogram for each potential threat object; smoothing the density histogram using a low-pass filter; identifying peaks in the smoothed density histogram; assigning a segment to each peak; computing histogram segment features for each segment; classifying each potential threat object into a threat or a non-threat using computed features.

28 Claims, 7 Drawing Sheets

METHOD OF AND SYSTEM FOR CLASSIFYING OBJECTS USING HISTOGRAM SEGMENT FEATURES OF MULTI-ENERGY COMPUTED TOMOGRAPHY IMAGES

RELATED APPLICATIONS

This patent application and/or patents are related to the following co-pending U.S. applications and/or issued U.S. patents, of the assignee as the present application, the contents of which are incorporated herein in their entirety by reference:

"Dual energy power supply," invented by Bernard M. Gordon, et al., U.S. Pat. No. 5,661,771, issued on Aug. 26, 1997;

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982,844, issued on Nov. 9, 1999;

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842, issued on Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113, issued on Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477, issued on Jun. 1, 1999;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198, issued on May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997, U.S. Pat. No. 5,887,047, issued on Mar. 23, 1999;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122, issued on Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997, now U.S. Pat. No. 6,256,404, issued on Jul. 3, 2001;

"Area Detector Array for Computed Tomography Scanning System," invented by David A Schafer, et al., U.S. application Ser. No. 08/948,450, filed on Oct. 10, 1997, now U.S. Pat. No. 6,091,795, issued on Jul. 18, 2000;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843, issued on Nov. 9, 1999;

"Measurement and Control System for Controlling System Functions as a Function of Rotational Parameters of a Rotating Device," invented by Geoffrey A. Legg, et al., U.S. application Ser. No. 08/948,493, filed on Oct. 10, 1997, now U.S. Pat. No. 5,932,874, issued on Aug. 3, 1999;

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028, issued on Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974, issued on Aug. 29, 2000;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871, issued on Jun. 13, 2000;

"Apparatus and Method for Combining Related Objects in Computed Tomography Data," invented by Ibrahim M. Bechwati, et al., U.S. application Ser. No. 09/022,060, filed on Feb. 11, 1998, now U.S. Pat. No. 6,128,365, issued on Oct. 3, 2000;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,025,143, issued on Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396, issued on Aug. 22, 2000;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642, issued on Jun. 20, 2000;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171, issued on Feb. 15, 2000;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Multiple-Stage Apparatus and Method for Detecting Objects in Computed Tomography Data," invented by Muzaffer Hiraoglu, et al., U.S. application Ser. No. 09/022,164, filed on Feb. 11, 1998, now U.S. Pat. No. 6,035,014, issued on Mar. 7, 2000;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998, now U.S. Pat. No. 6,067,366, issued on May 23, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Detecting Concealed Objects in Computed Tomography Data," invented by Sergey Simanovsky, et al., U.S. application Ser. No. 09/228,380, filed on Jan. 12, 1999, now U.S. Pat. No. 6,195,444, issued on Feb. 27, 2001;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Computed Tomography Apparatus and Method for Classifying Objects," invented by Sergey Simanovsky, et al., U.S. application Ser. No. 09/022,059, filed on Feb. 11, 1998, now U.S. Pat. No. 6,317,509, issued on Nov. 23, 2001;

"Apparatus and method for processing object data in computed tomography data using object projections," invented by Carl R. Crawford, et al, U.S. application Ser. No. 09/228,379, filed on Jan. 12, 1999, now U.S. Pat. No. 6,345,113, issued on Feb. 5, 2002;

"Apparatus and method for detecting concealed objects in computed tomography data," invented by Sergey Simanovsky, et al., U.S. application Ser. No. 09/228,380, filed on Jan. 12, 1999, now U.S. Pat. No. 6,195,444, issued on Feb. 27, 2001;

"Method of and system for correcting scatter in a computed tomography scanner," invented by Ibrahim M. Bechwati, et al, U.S. application Ser. No. 10/121,466, filed on Apr. 11, 2002, now U.S. Pat. No. 6,687,326, issued on Feb. 3, 2004;

"Method of and system for reducing metal artifacts in images generated by x-ray scanning devices," invented by Ram Naidu, et al, U.S. application Ser. No. 10/171,116, filed on Jun. 13, 2002, now U.S. Pat. No. 6,721,387, issued on Apr. 13, 2004;

"Method and apparatus for stabilizing the measurement of CT numbers," invented by John M. Dobbs, U.S. application Ser. No. 09/982,192, filed on Oct. 18, 2001, now U.S. Pat. No. 6,748,043, issued on Jun. 8, 2004;

"Method and apparatus for automatic image quality assessment," invented by Seemeen Karimi, et al, U.S. application Ser. No. 09/842,075, filed on Apr. 25, 2001, now U.S. Pat. No. 6,813,374, issued on Nov. 2, 2004;

"Decomposition of Multi-Energy Scan Projections using Multi-Step Fitting," invented by Ram Naidu, et al, U.S. application Ser. No. 10/611,572, filed on Jul. 1, 2003;

"Method of and system for detecting threat objects using computed tomography images," invented by Zhengrong Ying, et al, U.S. application Ser. No. 10/831,909, filed on Apr. 26, 2004;

"Method of and system for computing effective atomic number image in multi-energy computed tomography," invented by Zhengrong Ying, et al, U.S. application Ser. No. 10/850,910, filed on May 21, 2004;

"Method of and system for adaptive scatter correction in multi-energy computed tomography," invented by Zhengrong Ying, et al, U.S. application Ser. No. 10/853,942, filed on May 26, 2004;

"Method of and system for destreaking the photoelectric image in multi-energy computed tomography," invented by Zhengrong Ying, et al, U.S. application Ser. No. 10/860,984, filed on Jun. 4, 2004;

"Method of and system for extracting 3D bag images from continuously reconstructed 2D image slices in computed tomography," invented by Zhengrong Ying, et al, U.S. application Ser. No. 10/864,619, filed on Jun. 9, 2004;

"Method of and system for sharp object detection using computed tomography images," invented by Gregory L. Larson, et. al., U.S. application Ser. No. 10/883,199, filed on Jul. 1, 2004;

"Method of and system for X-ray spectral correction in multi-energy computed tomography," invented by Ram Naidu, et. al., U.S. application Ser. No. 10/899,775, filed on Jul. 17, 2004;

"Method of and system for detecting anomalies in projection images generated by computed tomography scanners," invented by Anton Deykoon, et. al., U.S. application Ser. No. 10/920,635, filed on Aug. 18, 2004 .

"Method of and system for stabilizing high voltage power supply voltages in multi-energy computed tomography," invented by Ram Naidu, et. al., U.S. application Ser. No. 10/958,713, filed on Oct. 5, 2004;

FIELD OF THE DISCLOSURE

The present disclosure relates to methods of and systems for processing images generated by multi-energy computed tomography scanners, and more particularly to a method of and a system for classifying objects using multi-energy computed tomography scanners in a baggage scanning system.

BACKGROUND OF THE DISCLOSURE

Various X-ray baggage scanning systems are known for detecting the presence of explosives and other prohibited items in baggage, or luggage, prior to loading the baggage onto a commercial aircraft. A common technique of measuring a material's density is to expose the material to X-rays and to measure the amount of radiation absorbed by the material, the absorption being indicative of the density. Since many explosive materials may be characterized by a range of densities differentiable from that of other items typically found in baggage, explosives are generally amenable to detection by X-ray equipment.

Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two-dimensional image. As the conveyor belt transports the baggage past the stationary source and detector array, the scanner generates a two-dimensional image representative of the density of the baggage, as viewed by the stationary detector array. The density image is typically displayed for analysis by a human operator.

Most explosives capable of significantly damaging an aircraft are sufficiently large in length, width, and height so as to be readily detectable by an X-ray scanner system regardless of the explosive's orientation within the baggage. Plastic explosives, however, present a particular challenge to baggage scanning systems. Due to their moldable nature, plastic explosives may be formed into geometric shapes that are difficult to detect. A plastic explosive powerful enough to damage an aircraft may be formed into a relatively thin sheet that is extremely small in one dimension and is relatively large in the other two dimensions. The detection of plastic explosives may be difficult because it may be difficult to see the explosive material in the image, particularly when the material is disposed so that the thin sheet is parallel to the direction of the X-ray beam as the sheet passes through the system.

Accordingly, a great deal of effort has been made to design a better baggage scanner. Such designs, for example, have been described in U.S. Pat. No. 4,759,047 (Donges et al.); U.S. Pat. No. 4,884,289 (Glockmann et al.); U.S. Pat. No. 5,132,988 (Tsutsui et al.); U.S. Pat. No. 5,182,764 (Peschmann et al.); U.S. Pat. No. 5,247,561 (Kotowski); U.S. Pat. No. 5,319,547 (Krug et al.); U.S. Pat. No. 5,367,552 (Peschmann et al.); U.S. Pat. No. 5,490,218 (Krug et al.) and German Offenlegungsschrift DE 31 503 06 A1 (Heimann GmbH).

At least one of these designs, described in U.S. Pat. No. 5,182,764 (Peschmann et al.) and U.S. Pat. No. 5,367,552 (Peschmann et al.) (hereinafter the '764 and '552 patents), has been commercially developed and is referred to hereinafter as the "Invision Machine." The Invision Machine includes a CT scanner of the third generation type, which typically includes an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include a linear array of detectors disposed as a single row in the shape of a circular arc having a center of curvature at the focal spot of the X-ray source, i.e., the point within the X-ray source from which the X-rays emanate. The X-ray source generates a fan shaped beam, or fan beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined, by and lie, within the planar imaging field. The fan beam is thus defined as the volume of space defined between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is designed to be relatively thin in the Z-axis direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors in a single row of the detector array for any measuring interval is referred to as a "projection," or equivalently as a "view," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from an appropriate point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well-known algorithms, a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation or Z-axis of the scanner. In general, the resolution of the CT image is inversely proportional to the width of the receiving surface of each detector in the plane of the fan beam.

The CT scanner should provide images of sufficient resolution to detect plastic explosives on the order of only a few millimeters thick. Therefore, to provide adequate resolution, many revolutions are required. To meet high baggage throughput rates, a conventional CT baggage scanner such as the InVision Machine can only afford to generate a few CT images per bag. Clearly, one cannot scan the entire bag within the time allotted for a reasonably fast throughput. Generating only a few CT images per baggage items leaves most of the item unscanned and therefore does not provide scanning adequate to identify all potential threat objects in the bag, such as sheets of explosive material.

To improve throughput, the InVision Machine uses a pre-screening process which produces a two-dimensional projection image of the entire bag from a single angle. Regions of the projection identified as potentially containing threat items can then be subjected to a full scan or manual inspection. With this pre-screening and selective region scanning approach, the entire bag is not scanned, thus allowing potential threat items to pass through undetected. This is especially true in the case of sheet items oriented transversely to the direction of propagation of the radiation used to form the pre-screen projection and where the sheet covers a relatively large portion of the area of the bag.

Another baggage scanning system is described in an International Patent Application under the Patent Cooperation Treaty, document number WO 96/13017, published on May 2, 1996, entitled, "X-Ray Computed Tomography (CT) System for Detecting Thin Objects," invented by Eberhard, et al. (referred to herein as the "Eberhard et al. system"). In the Eberhard, et al. system, an entire bag is subjected to a CT scan to generate voxel density data for the bag. A connected components labeling (CCL) process is then applied to the entire bag to identify objects by grouping voxels which are physically close together and which have densities within a predetermined range of densities. The voxels in each object are then counted to determine the volume of each object. If the volume of an object exceeds a threshold, the mass of the object is computed by multiplying the volume of each object voxel by its density and then totaling the individual voxel masses. If the mass of an object exceeds a mass threshold, the object is concluded to be a threat.

The Eberhard et al. publication teaches that its system can identify thin objects. The system sets its labeling density at a low level such that thin objects viewed edge-on which partially fill a voxel can be detected.

A significant drawback to the Eberhard et al. system is that it may miss thin objects such as sheet explosives that are not viewed edge-on and which cover a large area of the bag. These transversely oriented sheet objects will add only slightly to the density measured for the bag and will have only small density contrast with the background. If the density threshold used during CCL is set low enough to detect these sheets, then, because of the low contrast between the sheet and the background, the entire bag will be connected and labeled together, and no discernable object will be identified. If the threshold is set higher, then the sheet object will be missed.

Referring to the drawings, FIGS. 1, 2 and 3 show perspective, end cross-sectional and radial cross-sectional views, respectively, of a typical baggage scanning system 100, which includes a conveyor system 110 for continuously conveying baggage or luggage 112 in a direction indicated by arrow 114 through a central aperture of a CT scanning system 120. The conveyor system includes motor driven belts for supporting the baggage. Conveyer system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the present assignee and, which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 is preferably a two-dimensional array, such as the array described in U.S. Pat. No. 6,091,795 entitled, "Area Detector Array for Computed Tomography Scanning System." Other suitable arrays are known in the prior art. The system 120 further includes a data acquisition system (DAS) 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling the system 120. The computerized system can also include a monitor for displaying information including generated images. System 120 also includes shields 138, which may be fabricated from lead, for example, for preventing radiation from propagating beyond gantry 125.

The X-ray tube 128 may generate a pyramidally shaped beam, often referred to as a "cone beam," 132 of X-rays that pass through a three dimensional imaging field, through which conveying system 110 transports baggage 112. After passing through the baggage disposed in the imaging field, detector array 130 receives cone beam 132 and generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the conveyor system 110 continuously transports baggage through central aperture 126, so as to generate a plurality of projections at a corresponding plurality of projection angles.

Techniques using dual energy X-ray sources are known for providing additional information about a material's characteristics, beyond solely a density measurement. Techniques using dual energy X-ray sources involve measuring the X-ray absorption characteristics of a material for two different energy levels of X-rays. Depending upon the calibration of the scanner, dual energy measurements provide an indication of dual parameters of the material being scanned. For example, at one calibration setting, the dual parameters can be chosen to be the material's effective atomic number (Z is denoted as "effective atomic number") and the material's density. At another calibration setting, the dual parameters can be chosen to be the material's photoelectric coefficients and the material's Compton coefficients. At yet another calibration setting, the dual parameters can be chosen to be an amount of a first material present (e.g., plastic) and an amount of a second material present (e.g., aluminum). Dual energy X-ray techniques for energy-selective reconstruction of X-ray Computer Tomography (hereinafter referred to as CT) images are described, for example, in Robert E. Alvarez and Albert Macovski, "Energy-selective Reconstructions in X-ray Computerized Tomography," Phys. Med. Biol. 1976, Vol. 21, No. 5, 733-744; and U.S. Pat. Nos. 4,029,963 and 5,132,998. One algorithm used to generate such dual parameters from dual energy X-ray projection data is known as the Alvarez/Macovski Algorithm (hereinafter referred to as AMA). Others are known in the art.

One proposed use for such dual energy techniques has been in connection with a baggage scanner for detecting the presence of explosives in baggage. Explosive materials are generally characterized by a known range of atomic numbers and are therefore amenable to detection by such dual energy X-ray sources. One such dual energy source is described in U.S. Pat. No. 5,661,774, entitled "Improved Dual Energy Power Supply," assigned to the present assignee and incorporated herein by reference. When dual energy scanning mode is configured for the system as depicted in FIGS. 1, 2 and 3, the control system 136 supplies modulated high voltages with respect to alternating projection angles to the X-ray tube 128. The detector array 130 then receives data corresponding to high-energy and low-energy X-ray spectra in alternating projection angles. Other dual energy sources are known in the art.

Post-reconstruction analysis and pre-reconstruction analysis are the two prior art techniques generally recognized for using dual energy X-ray sources in materials analysis (e.g., in a baggage scanner for detecting the presence of explosives in baggage). In post-reconstruction analysis, the signal flow is as shown in FIG. 4. The scanner 120 is typically similar to the one shown in FIGS. 1-3 and has an X-ray source capable of producing a fan or cone beam at two distinct energy levels (i.e., dual energy). The DAS 134 gathers signals generated by detector array 130 at discrete angular positions of the rotating platform 124, and passes the signals to the pre-processing unit 206. The pre-processing unit 206 re-sorts the data it receives from the DAS 134 in order to optimize the sequence for the subsequent mathematical processing. The pre-processing unit 206 also corrects the data from the DAS 134 for detector temperature, intensity of the primary beam, gain and offset, and other deterministic errors. Finally, the pre-processing unit 206 extracts data corresponding to high-energy views and routes it to a high-energy path 208, and routes the data corresponding to low-energy views to a low-energy path 210. A first reconstruction computer 218 receives the projection data from the high-energy path 208 and generates a CT image $I_H$ 226 corresponding to the high-energy series of projections. A second reconstruction computer 220 receives the projection data from the low-energy path 210 and generates a CT image $I_L$ 224 corresponding to the low-energy series of projections. A post-processing unit 230 receives the high-energy CT image 226 and the low-energy CT image 224 and performs voxel-by-voxel processing to yield the effective atomic number, denoted as Z, image $I_z$ 232. The Z image 232 and the high-energy CT image 226 can be provided to operators on a display 240, and both images can be used for automatic explosive detection in 238 as well. The images from the post-reconstruction analysis usually do not yield accurate estimates of the material's effective atomic number, and suffer low SNR (Signal to Noise Ratio) and many artifacts as well.

In pre-reconstruction analysis, the signal flow is as shown in FIG. 5. As is described herein for pre-reconstruction analysis, the dual energy decomposition computer 212 receives the projection data on the high-energy path 208 and the low-energy path 210 and performs the Alvarez/Macovski Algorithm to produce a first stream of projection data $A_c$ 214, which is dependent on a first parameter of the material being scanned, and a second stream of projection data $A_p$ 216, which is dependent on a second parameter of the material scanned. The first material parameter is often the Compton coefficient $a_c$, and the second material parameter is often the photoelectric coefficient $a_p$. A first reconstruction computer 219 receives the first stream of projection data 214 and generates a Compton image $I_c$ 227 from the series of projections corresponding to the first material parameter. A second reconstruction computer 221 receives the second stream of projection data 216 and generates a photoelectric image $I_p$ 225 from the series projections corresponding to the second material parameter. The third reconstruction computer 218 receives the stream of projection data 208 and generates a high-energy CT image $I_H$ 226. The two images 225 and 227 are processed in the post-processing unit 230 to yield a Z image $I_z$ 232. The High-energy CT image 226 and the Z image 232 can be provided to operators on a display 240, and both images can be used for automatic explosive detection in detection unit 238 as well. The pre-reconstruction analysis yields better estimates of material's effective atomic number than the post-reconstruction analysis. However the pre-reconstruction analysis requires one more reconstruction computer than the post-reconstruction analysis.

Various approaches have been used for decomposition of the input projection data $P_L$ and $P_H$ into Compton projections $A_c$ and photoelectric projections $A_p$. For example, the AMA method approximates $P_L$ and $P_H$ using polynomial functions in terms of $A_c$ and $A_p$. The coefficients of the polynomial functions are determined through a calibration procedure as follows. By measuring the projection values of the combination of various thicknesses of two known materials, the coefficients can be calculated through a polynomial least squares fitting between the measured and modeled $P_L$ and $P_H$. Once the coefficients of the polynomial functions are determined, the decomposition of the Compton and Photoelectric projections $A_c$ and $A_p$ from projections $P_L$ and $P_H$ is usually solved using the Newton-Raphson method.

Another prior art method of performing decomposition is the direct approximation method, discussed in L. A. Lehmann, R. E. Alvarez, A. Macovski, W. R. Brody, N. J. Pelc, S. J. Riederer, and A. L. Hall, *Generalized Image Combinations In Dual KVP Digital Radiography*, Med. Phys. 8, 659-667 (1981). In the direct approximation method, $A_c$ and $A_p$ are approximated as polynomial functions in terms of $P_L$ and $P_H$. The coefficients of the polynomial functions in the direct approximation method are determined through a calibration procedure by measuring the projection values of the combination of various thicknesses of two known materials.

In yet another prior art method, decomposition is accomplished using iso-transmission lines, described K. Chuang and H. K. Huang, *A Fast Dual-Energy Computational Method Using Isotransmission Lines and Tables*, Med. Phys. 14, 186-192 (1987). According to this method, for a given projection value, an isotransmission line is represented by a linear equation in two basis functions. The isotransmission line method requires a large amount of calibration data. Further, the isotransmission line becomes increasingly non-linear as the projection value increases. In such a situation, the linear equations are not valid and the method causes large approximation errors.

CT images and Z (effective atomic number) images can be generated from both the pre-reconstruction and post-reconstruction analysis. The CT images measure the CT number of scanned materials, which approximates the density of the materials; the Z image measures the effective atomic number of the scanned materials. The measurements of both CT number and Z can be used for automatic explosive detection.

In the assignee's single energy CT baggage scanning system as described and claimed in the U.S. patent applications listed above and incorporated herein by reference, single energy CT images without atomic number (Z) images are used to identify and classify threat items such as explosives by analyzing mass and/or density of identified objects in general. Voxels in CT data for a piece of baggage are associated with density values. Voxels having density values within certain predetermined ranges of density can be identified and grouped together as objects. After objects are thus identified, a discrimination approach is applied in which identified objects can be classified as to whether they pose a threat. Using voxel volumes and masses of identified objects are compared to predetermined mass thresholds. Analysis of this comparison and other predetermined discrimination parameters, such as mean and standard deviation of the density, is used to determine whether the identified object can be classified as a threat object.

With the dual energy CT scanner producing both the CT image and the Z image, it is beneficial to use both types of images for threat detection in order to reduce false alarm rate, thus lowering the labor cost for checked luggage screening.

The mean and standard deviation of the measured density and atomic number of a segmented object usually do not provide enough information of the object for classification. This results in a high false alarm rate for the explosive detection system.

Objects usually comprise parts or portions that are different from each other. For example, a bottle containing liquor as one object comprises two portions: the glass bottle and the liquid liquor. These two portions are physically very different. They are different in the density, atomic number, uniformity of the density and atomic number as well. The mean and standard deviation of the density and atomic number measurements for objects with different portions can not provide sufficient information for accurate classification. Thus, to further reduce the false alarm rate, it is desirable to use other statistics derived from the density and atomic number measurements representing richer information of the segmented object for discriminating threats from non-threats.

SUMMARY OF THE DISCLOSURE

The present disclosure is directed to an object identification method and a computed tomography (CT) baggage scanning system which uses the object identification method of the present disclosure. The object identification method of the disclosure analyzes acquired CT density data and Z (atomic number) data for a region of interest in order to detect objects in the data.

In one embodiment of the present disclosure, the mean density, the mean atomic number, the standard deviation of the density, the standard deviation of the atomic number, and the mass for each object are computed and used for initial discrimination to identify potential threat objects.

In one embodiment of the present disclosure, the potential threat objects are further discriminated from other objects using histogram segment features. The histogram segment features are computed using both CT image and Z image data for each histogram segment, which in turn is defined using the density histogram of the CT image. According to one aspect of the present disclosure, each histogram segment corresponds to one portion of the potential threat object. Histogram segments can be overlapped with each other.

In one embodiment of the present disclosure, the method of computing the histogram segment features comprises: computing a density histogram for each potential threat object using CT image data; smoothing the density histogram using a low-pass filter; identifying peaks in the smoothed density histogram; assigning a segment to each peak; computing histogram segment features for each segment using CT and Z image data.

According to one aspect of the present disclosure, the histogram segment features include mean density, peak density, density standard deviation, segment width, segment skewness, segment kurtosis, mean atomic number, and Z standard deviation.

In one embodiment of the present disclosure, potential objects with more than one histogram segment are further discriminated from other objects; and potential objects with only one histogram segment are classified as threats without further discrimination.

A system for classifying objects using local distribution features of multi-energy CT image data is also disclosed. The system includes modules configured to implement the above functionality. The system may include a module for computing histogram segment features and a module for classifying objects based on the histogram segment features.

While this disclosure has been particularly shown and described with references to preferred embodiments thereof, it will be understood by those skilled in the art that various changes in form and detail may be made therein without departing from the spirit and scope of the disclosure as defined by the following claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

Figure 1:
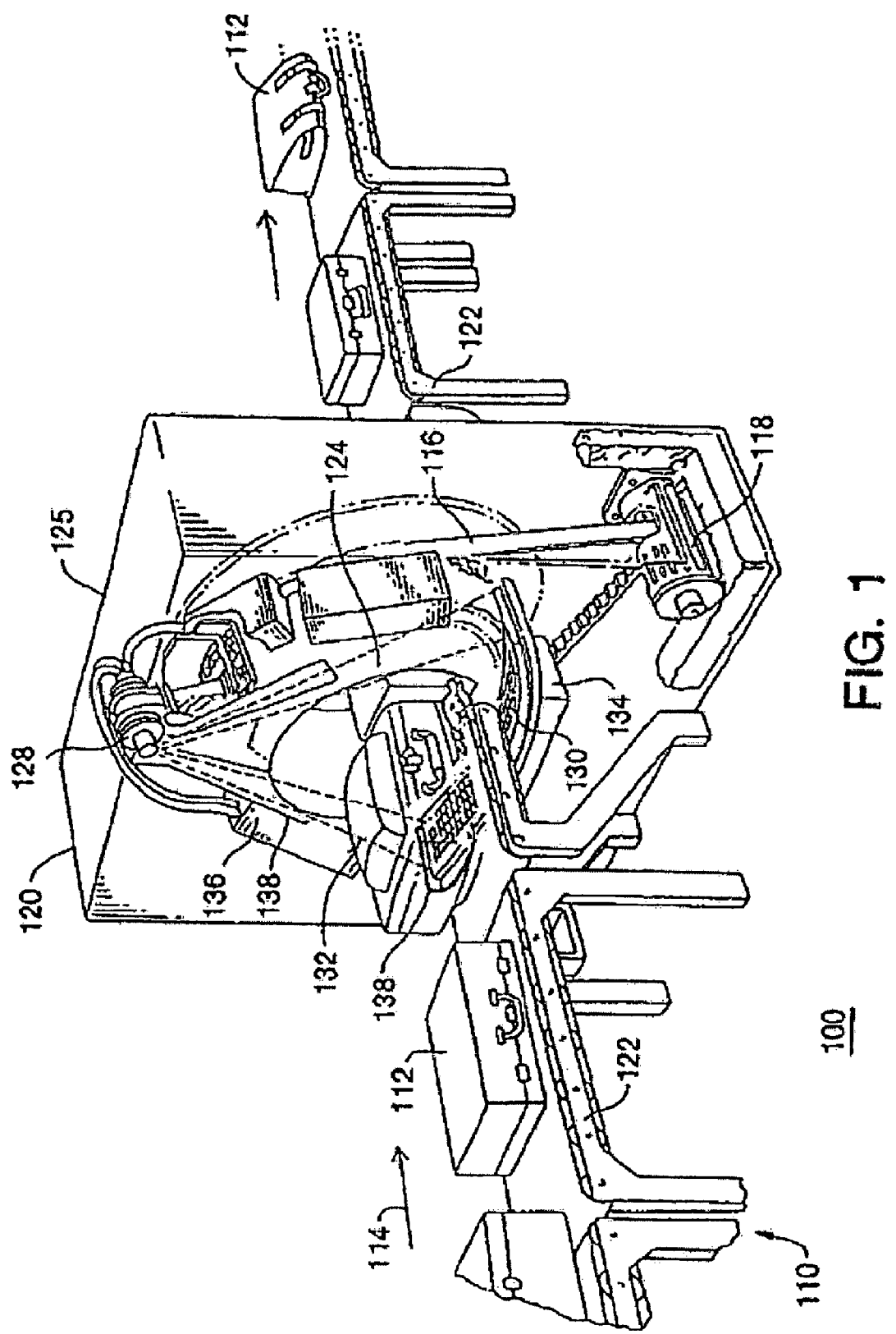
FIG. 1 is a perspective view of a baggage scanning system, known in the prior art.
Figure 2:
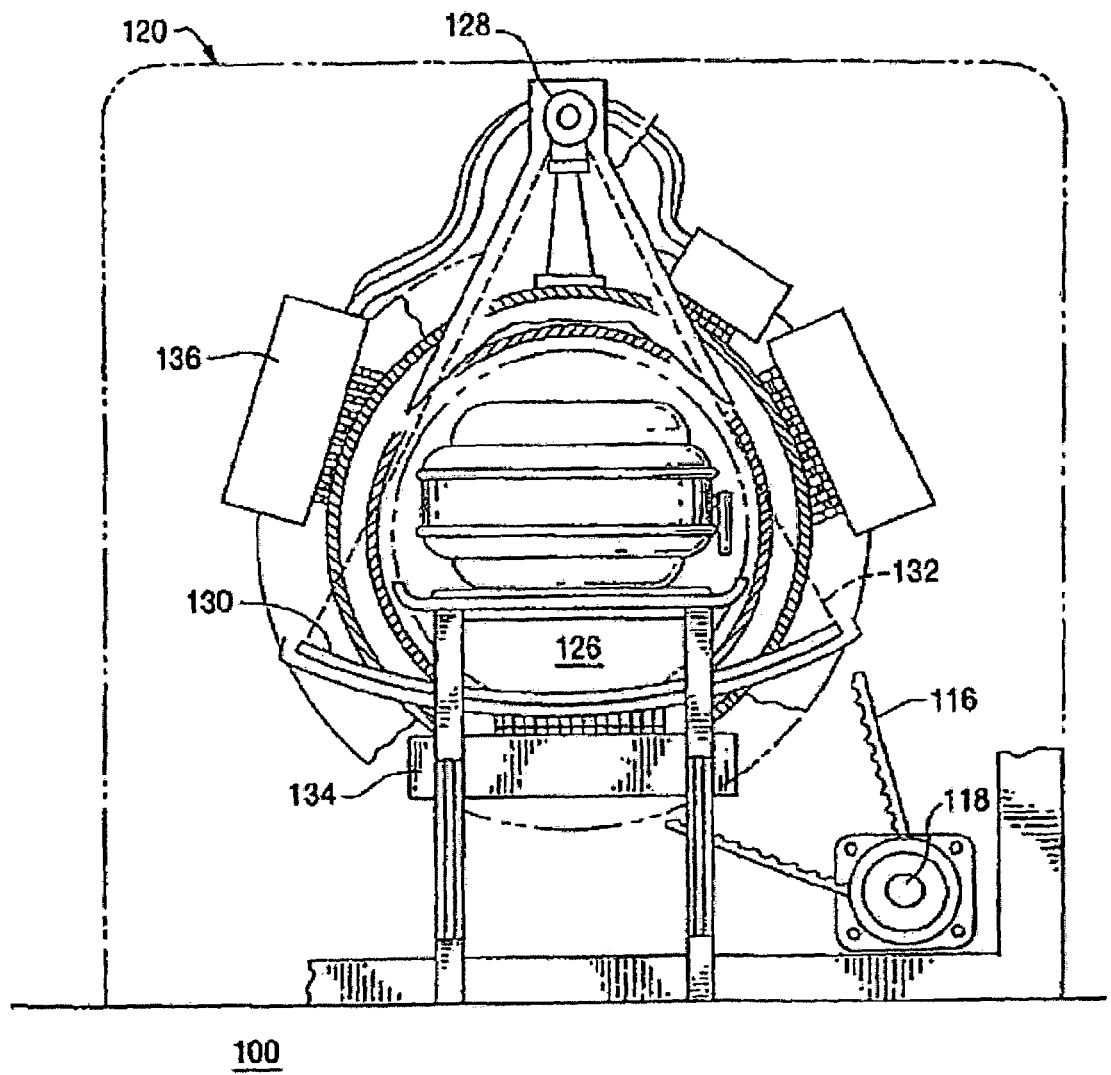
FIG. 2 is a cross-sectional end view of the system of FIG. 1.
Figure 3:
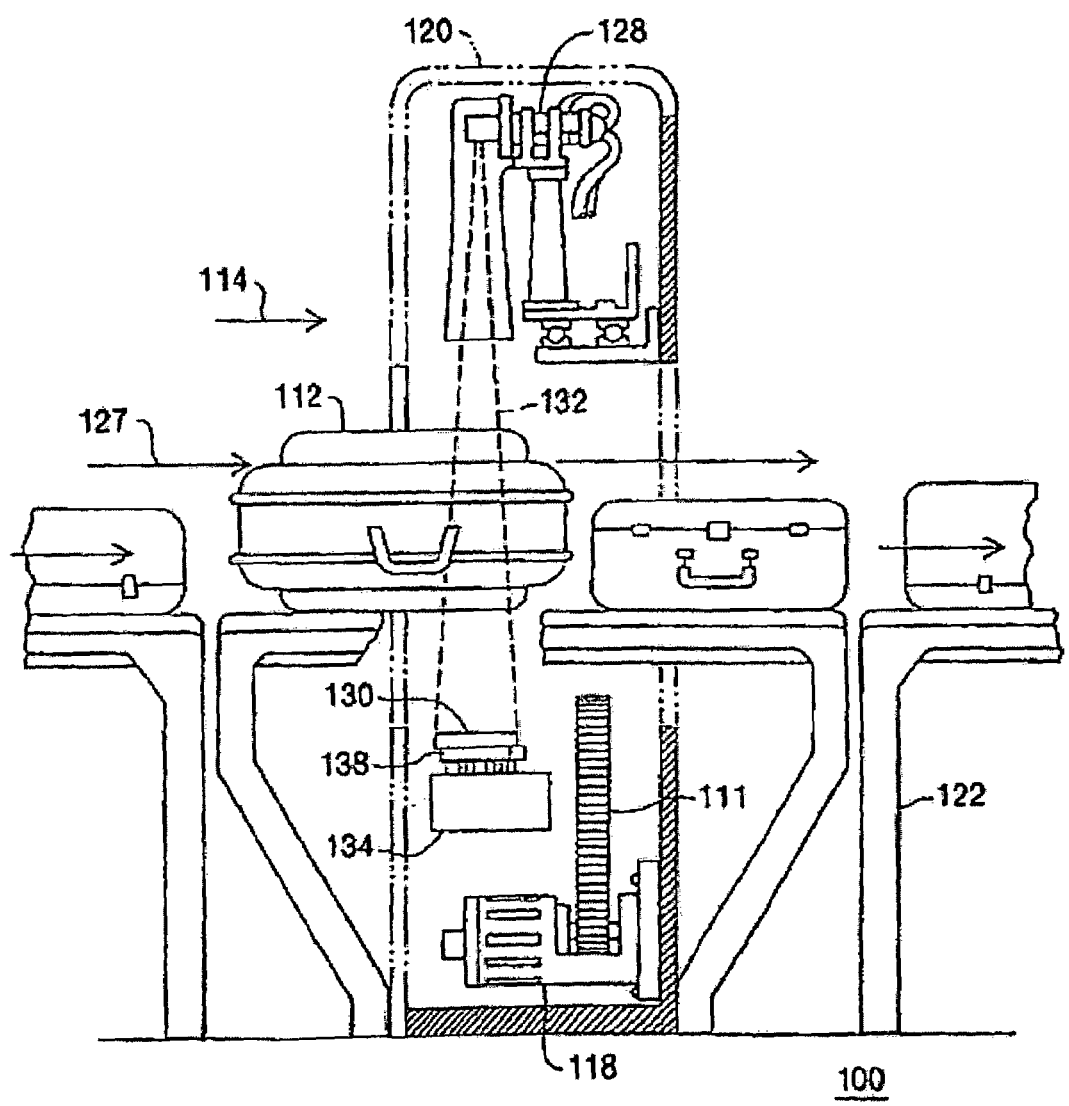
FIG. 3 is a cross-sectional radial view of the system of FIG. 1.
Figure 4:
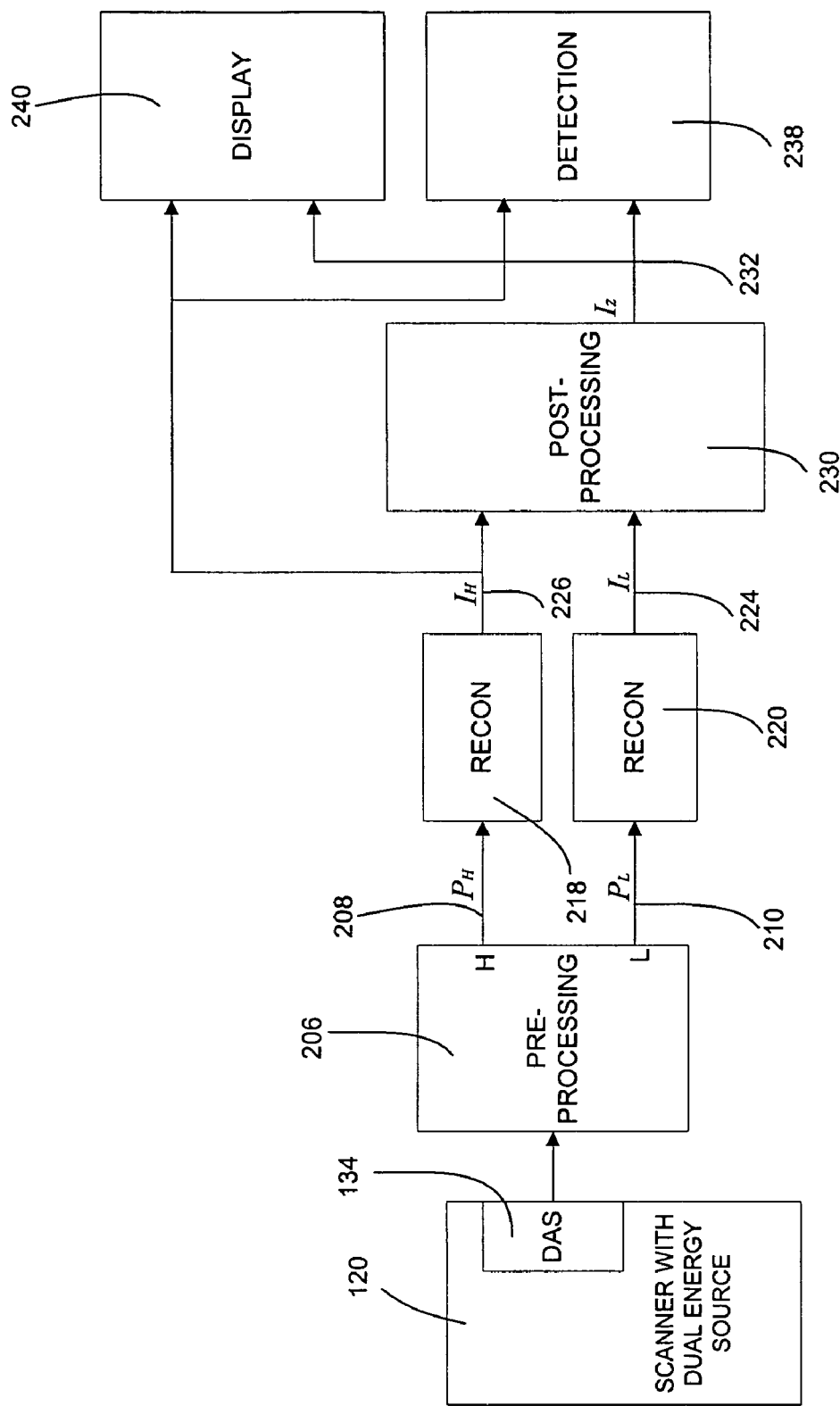
FIG. 4 is a signal flow diagram of a system capable of performing post-reconstruction analysis, useful in the system of FIG. 1.
Figure 5:
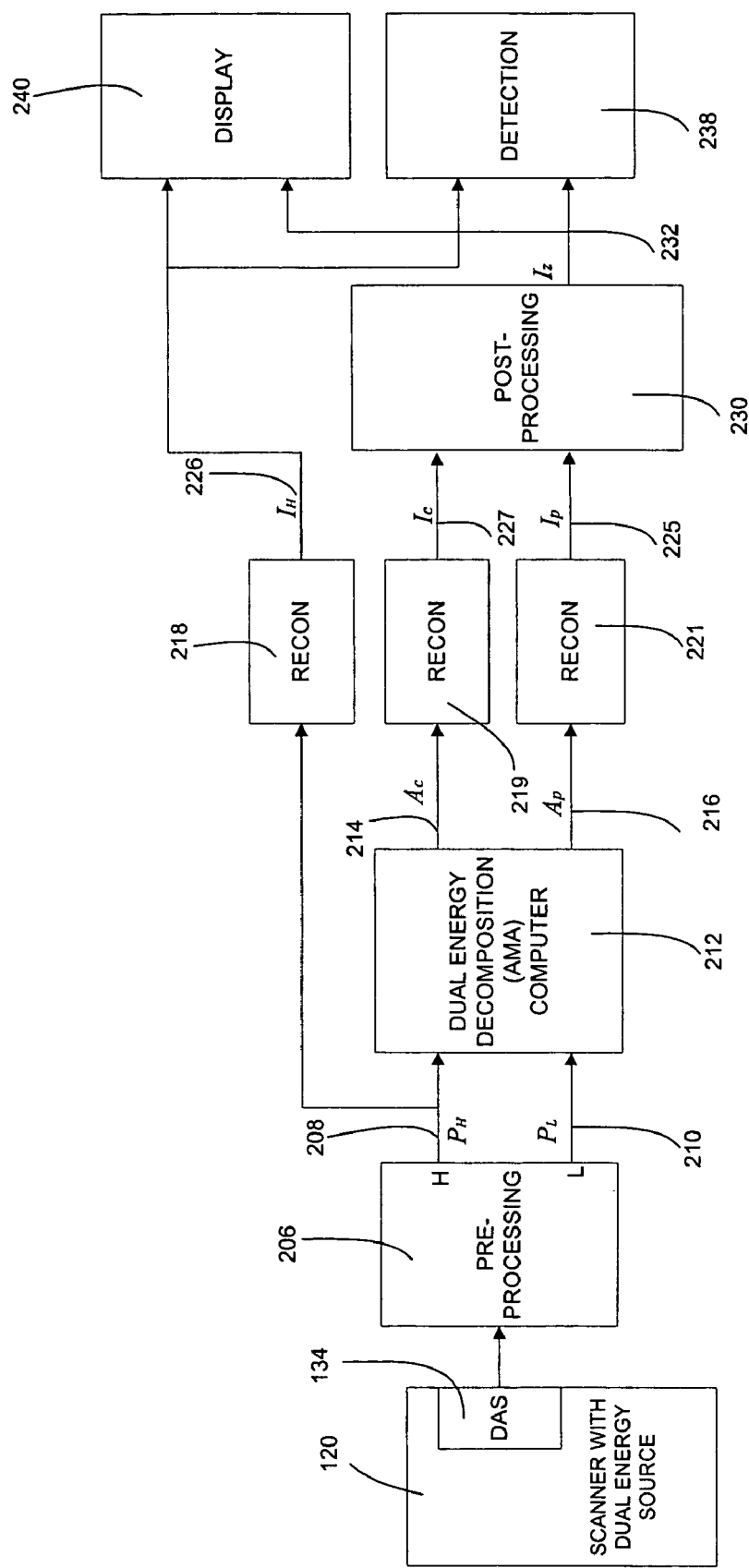
FIG. 5 is a signal flow diagram of a system capable of performing pre-reconstruction analysis, useful in the system of FIG. 1.

The present disclosure provides a system and a method which detect, identify and/or classify objects in multi-energy CT data including a CT image, which approximates the density measurements of the scanned objects, and a Z (effective atomic number) image, which approximates the atomic number measurements of scanned objects. The disclosure can therefore be implemented in a CT baggage scanning system. The objects identified by the disclosure can be objects known to pose threats to persons at an airport or on board an aircraft. These objects can include explosive objects and materials.

The generation of the CT image and Z image data from a dual energy CT scanner is preferably performed using methods described in the assignee's "Method of and System for Adaptive Scatter Correction in Multi-Energy Computed Tomography" by Zhengrong Ying, et al. U.S. application Ser. No. 10/853,942, filed on May 26, 2004; incorporated herein by reference; "Method of and System for Destreaking the Photoelectric Image in Multi-Energy Computed Tomography" by Zhengrong Ying, et. al. U.S. application Ser. No. 10/860,984, filed on Jun. 4, 2004; incorporated herein by reference; "Decomposition of Multi-Energy Scan Projections Using Multi-Step Fitting" by Naidu, et. al. U.S. application Ser. No. 10/611,572, filed on Jul. 1, 2003, incorporated herein by reference; "Method of and System for Computing Effective Atomic Number Image in Multi-Energy Computed Tomography" by Zhengrong Ying, et. al. U.S. application Ser. No. 10/850,910, filed on May 21, 2004, incorporated herein by reference; and "Method of and System for X-ray Spectral Correction in Multi-Energy Computed Tomography," invented by Ram Naidu, et. al., U.S. application Ser. No. 10/899,775, filed on Jul. 27, 2004, incorporated herein by reference.

NSR (as described in U.S. Pat. No. 5,802,134, the latter being incorporated herein its entirety by reference) reconstruction of the dual energy images not only generates a 3D CT image and a 3D Z image for each piece of scanned luggage, but also generates at least two 2D projection images. The 2D projections images are similar to the projection images obtained from line-projection scanners. In one embodiment of the present disclosure, these 2D projection images are used to detect shield objects.

Throughout this application, the term "3-D CT image" and the symbol $C(i, j, k)$ are used to represent a set of CT slice images. The size of each CT slice is I columns by J rows. The symbol i in $C(i, j, k)$ represents the column index and runs from 0 to I−1. Similarly, the symbol j represents the row index and runs from 0 to J−1. There are K of these slices in a set. The symbol k represents one of these slices and runs from 0 to K−1. The function $C(i, j, k)$ is used to refer to or represent a particular CT density in this set, meaning that it is the CT density value at the $i^{th}$ column and the $j^{th}$ row of the $k^{th}$ slice. The CT densities are represented by nonnegative integers with 0 (Hounsfield units) corresponding to the density of air and 1000 (Hounsfield units) corresponding to the density of water, although if desired other integer values can be used.

Similarly, throughout this application, the term "3-D Z image" and the symbol $Z(i, j, k)$ are used to represent a set of Z slice images. The size of the Z image is the same as the CT image, that is, I columns by J rows by K slices. The function Z(i, j, k) is used to refer to, or represent, a particular atomic number in this set, meaning that it is the atomic number value multiplied by 100 at the $i^{th}$ column and the $j^{th}$ row of the $k^{th}$ slice. For example, Aluminum has an atomic number value of 13, and it is typically represented by a value of 1300 in the Z image.

Figure 6:
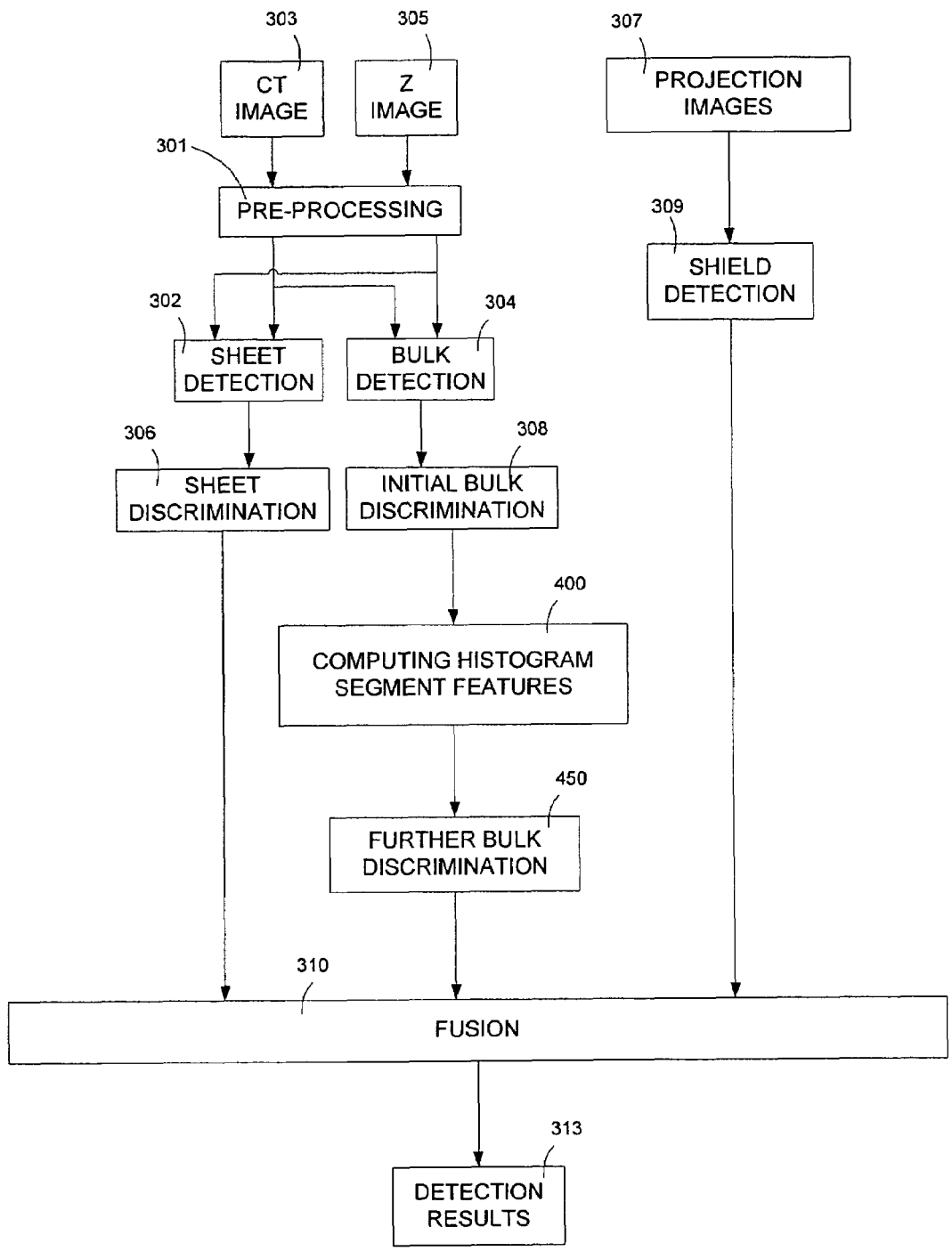
FIG. 6 contains a flow diagram of the logical flow of one embodiment of the object identification method of the present disclosure.

FIG. 6 contains a top-level flow diagram which illustrates the logical flow of one embodiment of the object identification method of the disclosure. In one embodiment, in a first step 301, reconstructed CT image data 303 and Z image data 305 are received and pre-processed. The preprocessing step 301 includes finding a Region Of Interest (ROI) from the CT image data, and applying the ROI to the Z image data. The preprocessing step also includes an erosion operation to disconnect thinly connected objects. The methods of finding the ROI and performing the erosion operation are described in U.S. Pat. Nos. 6,076,400, 6,195,444, 6,272,230, 6,317,509, assigned to the present assignee and incorporated herein by reference (hereinafter the "ROI and Erosion Patents").

Along the sheet detection path, sheet-shaped objects are first detected in the sheet detection step 302. The sheet detection preferably uses Constant False Alarm Rate (CFAR) and Connected Component Labeling (CCL) methods, which are described in the ROI and Erosion Patents, to segment sheet objects from the CT image. The outputs of sheet explosive detection step 302 include data representing a label image for sheet explosives $L_s(i, j, k)$ (same size as C(i, j, k)), and the number of detected sheet explosives $N_s$. Each sheet object $l=1, \ldots N_s$ is defined by a plurality of voxels in $L_s(i, j, k)$ with the label number, l.

In the sheet discrimination step 306, data representing detected objects are analyzed to determine if they are threats. The mean density, $\rho_l^{sheet}$, the standard deviation of the density, $\sigma_l^{\rho sheet}$, the mass, $m_l^{sheet}$, the mean atomic number, $Z_l^{sheet}$, and the standard deviation of the atomic number, $\sigma_l^{Zsheet}$, for each sheet object, $l=1, \ldots N_s$ are computed for discrimination:

$$\rho_l^{sheet} = \frac{1}{N_l} \sum_{L_s(i,j,k)=l} C(i, j, k)$$

$$\sigma_l^{\rho sheet} = \sqrt{\frac{1}{N_l} \sum_{L_s(i,j,k)=l} (C(i, j, k) - \rho_l^{sheet})^2}$$

$$Z_l^{sheet} = \frac{1}{N_l} \sum_{L_s(i,j,k)=l} Z(i, j, k)$$

$$\sigma_l^{Zsheet} = \sqrt{\frac{1}{N_l} \sum_{L_s(i,j,k)=l} (Z(i, j, k) - Z_l^{sheet})^2}$$

where $N_l$ is the number voxels for sheet object $l=1, \ldots N_s$.

For each sheet object, the decision is made whether this sheet object is a potential threat based on the object mass, the mean and standard deviation of the density, and the atomic number. The sheet object is a threat if all of the followings are met:

Mass $m_l^{sheet}$ is greater than a threshold $M_{sheet}$

Mean density $\rho_l^{sheet}$ is within a range ($\rho_{sheet}^{min}, \rho_{sheet}^{max}$)

Standard deviation of the density $\sigma_l^{\rho sheet}$ within a range ($\sigma_{sheet}^{\rho\,min}, \sigma_{sheet}^{\rho\,max}$)

Mean atomic number $Z_l^{sheet}$ is within a range ($Z_{sheet}^{min}, Z_{sheet}^{max}$)

Standard deviation of the atomic number $\sigma_l^{Zsheet}$ within a range ($\sigma_{sheet}^{Z\,min}, \sigma_{sheet}^{Z\,max}$)

The parameters $M_{sheet}$, ($\rho_{sheet}^{min}, \rho_{sheet}^{max}$), ($\sigma_{sheet}^{\rho\,min}, \sigma_{sheet}^{\rho\,max}$), ($Z_{sheet}^{min}, Z_{sheet}^{max}$), and ($\sigma_{sheet}^{Z\,min}, \sigma_{sheet}^{Z\,max}$) are experimentally determined to yield certain detection performance, including the probability of detection and probability of false alarm. These parameters can be dependent on the specific types of explosives, and can also be dependent on the mass of the explosive, such as described in "Apparatus and Method for Classifying Objects in Computed Tomography Data Using Density Dependent Mass Thresholds," invented by Ibrahim M. Bechwati, et. al. U.S. Pat. No. 6,076,400, issued on Jun. 20, 2000, incorporated herein by reference.

The bulk object detection process of the disclosure preferably searches the bag image data for clusters of voxels in the density range of interest, and labels them as bulk objects. The bulk object detection process can also use mass, density, atomic number, and other statistics as features to determine if an object is a threat.

Along the bulk detection path, bulk-type objects are detected in the bulk detection step 304. The bulk detection preferably includes performing CCL, pruning, dilation, partial volume correction, and object merging, which are described in the ROI and Erosion Patents, to segment the CT image into objects. The outputs of bulk detection step 304 preferably include a label image for bulk explosives $L_b(i, j, k)$ (same size as C(i, j, k)), the number of detected bulk explosives $N_b$, the eroded mean density $\sigma_l^{\rho bulk}$, the standard deviation of the eroded density $\sigma_l^{\rho bulk}$, and the partial volume corrected mass $m_l^{bulk}$. Each bulk object $l=1, \ldots N_b$ is defined by a plurality of voxels in $L_b(i, j, k)$ with the label number l.

In the initial discrimination step 308, detected objects are analyzed to determine if they are potential threats. The mean atomic number, $Z_l^{bulk}$, and the standard deviation of the atomic number, $\sigma_l^{Zbulk}$, for each bulk object, $l=1, \ldots N_b$, are also preferably computed for the initial discrimination as:

$$Z_l^{bulk} = \frac{1}{N_l} \sum_{L_b(i,j,k)=l} Z(i, j, k)$$

$$\sigma_l^{Zbulk} = \sqrt{\frac{1}{N_l} \sum_{L_b(i,j,k)=l} (Z(i, j, k) - Z_l^{bulk})^2}$$

where $N_l$ is the number of voxels for bulk object $l=1, \ldots N_b$.

For each bulk object, the decision is made whether this bulk object is a potential threat preferably based on the object mass, the mean and standard deviation of the density and the atomic number. The bulk object is a potential threat if all of the following are met:

Mass $m_l^{bulk}$ is greater than a threshold $M_{bulk}$

Mean eroded density $\rho_l^{bulk}$ is within a range ($\rho_{bulk}^{min}, \rho_{bulk}^{max}$)

Standard deviation of the eroded density $\sigma_l^{\rho bulk}$ is within a range ($\sigma_{bulk}^{\rho\,min}, \sigma_{bulk}^{\rho\,max}$)

Mean atomic number $Z_l^{bulk}$ is within a range ($Z_{bulk}^{min}, Z_{bulk}^{max}$)

Standard deviation of the atomic number $\sigma_l^{Zbulk}$ is within a range ($\sigma_{bulk}^{Z\,min}, \sigma_{bulk}^{Z\,max}$)

The parameters $M_{bulk}$, ($\rho_{bulk}^{min}, \rho_{bulk}^{max}$), ($\sigma_{bulk}^{\rho\,min}, \sigma_{bulk}^{\rho\,max}$), ($Z_{bulk}^{min}, Z_{bulk}^{max}$), and ($\sigma_{bulk}^{Z\,min}, \sigma_{bulk}^{Z\,max}$) are empirically or experimentally determined to yield a certain detection performance preferably including the probability of detection and probability of false alarm. These parameters can be dependent on specific types of explosives, and can also be dependent on the mass of the explosive, such as in the method described in "Apparatus and Method for Classifying Objects in Computed Tomography Data Using Density Dependent Mass Thresholds," invented by Ibrahim M. Bechwati, et. al. U.S. Pat. No. 6,076,400, issued on Jun. 20, 2000, and incorporated herein by reference.

The initial discrimination step removes some non threat objects. As mentioned before, the mean and standard deviation of the density and atomic number measurements are not sufficient to represent the segmented objects for classification.

Objects usually comprise parts or portions that are different from each other. The mean and standard deviation of the density and atomic number measurements for objects with different portions can not provide sufficient information for accurate classification. The histogram segment features described in this disclosure provide additional information about the object, thus yielding more discriminating capability for classifying objects. The additional information not only represents the whole object, but also represents different portions of the object. The histogram segment features are computed using both the CT image and Z image for each histogram segment, which is defined using the density histogram of the CT image. The details for computing the histogram segment features are described below.

In connection with FIG. 6, Step 400 computes the histogram segment features. The inputs include data from the CT image $C(i,j,k)$ and the label image $L_b(i,j,k)$. Let l be the label of the object of the interest, and $H(n)$ ($n=0, \ldots, N_h-1$) be a density histogram of the object of the interest, where $N_h$ is the number of the histogram bins. The density histogram $H(n)$ ($n=0, \ldots, N_h-1$) is calculated as follows, $$H(n) = \sum_{L(i,j,k)=l} \delta\left(n - \left\lfloor \frac{C(i,j,k) - \rho_{his}^{min}}{\rho_{his}^{bin}} \right\rfloor\right)$$

where the function $$\left\lfloor \frac{C(i,j,k) - \rho_{his}^{min}}{\rho_{his}^{bin}} \right\rfloor$$

is the largest integer no greater than $$\frac{C(i,j,k) - \rho_{his}^{min}}{\rho_{his}^{bin}},$$

$\rho_{his}^{min}$ is the minimum value of the density histogram, $\rho_{his}^{bin}$ is the bin width of the density histogram, $\rho_{his}^{min}$ and $\rho_{his}^{bin}$ are pre-determined constants, and $$\delta\left(n - \left\lfloor \frac{C(i,j,k) - \rho_{his}^{min}}{\rho_{his}^{bin}} \right\rfloor\right)$$

is a discrete impulse function as follows:

$$\delta\left(n - \left\lfloor \frac{C(i,j,k) - \rho_{his}^{min}}{\rho_{his}^{bin}} \right\rfloor\right) = \begin{cases} 1, & n - \left\lfloor \frac{C(i,j,k) - \rho_{his}^{min}}{\rho_{his}^{bin}} \right\rfloor = 0 \\ 0, & \text{otherwise.} \end{cases}$$

Multiple objects or multiple portions of an object with different densities have multiple segments in the density histogram. Each segment is associated with a peak in the density histogram. The density histogram is smoothed using a low-pass filter. Let $h(n)$ be a low-pass filter, which is defined as follows:

$$h(n) = \begin{cases} \frac{1}{2L+1}, & -L \leq n \leq L \\ 0, & \text{otherwise.} \end{cases}$$

Let $H_1(n)$ ($n=0, \ldots, N_h-1$) be the filtered density histogram, computed as follows:

$$H_1(n) = \begin{cases} \sum_{i=-L}^{L} H(n-i)h(i), & L \leq n \leq N_h - L - 1 \\ H(n), & \text{otherwise.} \end{cases}$$

A first order derivative of the smoothed histogram, denoted as $m(n)$ ($n=0, \ldots, N_h-1$), is then calculated as follows:

$$m(n) = \begin{cases} H_1(n) - H_1(n-1), & 1 \leq n \leq N_h - 1 \\ 0, & \text{otherwise} \end{cases}$$

Each point of the smoothed histogram is classified into one of the following six states (from 0 to 5) according to $m(n)$. Let $T(n)$ be a state variable for the smoothed density histogram point n.

$T(n)=1$, if $m(n)>0$ and $m(n+1)<0$; this point is a local peak of $H_1(n)$;

$T(n)=2$, if $m(n)>0$ and $m(n+1)=0$; this point is a transition point from an ascent to a plateau of $H_1(n)$;

$T(n)=3$, if $m(n)=0$ and $m(n+1)<0$; this point is a transition point from a plateau to a descent of $H_1(n)$;

$T(n)=4$, if $m(n)=0$ and $m(n+1)>0$; this point is a transition point from a plateau to an ascent of $H_1(n)$;

$T(n)=5$, if $m(n)<0$ and $m(n+1)=0$; this point is a transition point from a descent to a plateau of $H_1(n)$;

$T(n)=0$, other cases;

A peak at point n of the smoothed density histogram is defined as one of the following two cases:

$T(n)=1$; this corresponds to a local peak; or $$T\left(n - \left\lfloor \frac{k}{2} \right\rfloor\right) = 2, \; T\left(n + \left\lfloor \frac{k-1}{2} \right\rfloor\right) = 3, \text{ and } \sum_{n-\lfloor \frac{k}{2} \rfloor}^{n+\lfloor \frac{k-1}{2} \rfloor} T[i] = 0;$$

this corresponds to the middle point of a raised plateau, and k is the length of the raised plateau.

Let $N_p$ be the number of peaks, and $n_q^P$ ($0 \leq q \leq N_p-1$) be the location of the $q^{th}$ peak of the smoothed density histogram. A segment containing $q^{th}$ peak, denoted as $S_q(n)$ ($n=0, \ldots, n_q^e - n_q^s$), is defined as a continuous portion of the density histogram $H(n)$ containing a starting point, denoted as $n_q^s$, and an ending point denoted as $n_q^e$. The starting point $n_q^s$ is defined as follows:

$$H_1(n_q^s) \leq H_1(n_q^s+1), H_1(n_q^s) < H_1(n_q^s-1), \text{ and}$$
$$n_{q-1}^P < n_q^s < n_q^P;$$

the ending point $n_q^e$ is defined as follows:

$$H_1(n_q^e) \leq H_1(n_q^e+1), H_1(n_q^e) < H_1(n_q^e-1), \text{ and}$$
$$n_q^P < n_q^e < n_{q+1}^P;$$

and the segment $S_q(n)$ is defined as follows:

$$S_q(n) = H(n+n_q^s) \text{ for } n=0, \ldots, n_q^e - n_q^s.$$

Note that the starting point and the ending point are unique points between any two consecutive peaks.

Each density histogram segment represents portion of object in the 3D space. The 3D object is divided into $N_p$ portions according to the division of the density histogram. Let $O_q$ be the set of voxels corresponding to the $q^{th}$ density histogram segment, which is defined as follows:

$$O_q = \{(i,j,k): L(i,j,k)=l, \rho_{hist}^{min} + n_q^s \rho_{hist}^{bin} \leq C(i,j,k) \leq \rho_{hist}^{min} + n_q^e \rho_{hist}^{bin}\}.$$

Let $N_q^O$ be the number of voxels for $q^{th}$ segment. $N_q^O$ is computed as follows:

$$N_q^O = \sum_{n=0}^{n_q^e - n_q^s} S_q(n)$$

For each segment of the density histogram, the following segment features are computed:

Peak density, denoted as $\rho_q^P$, is computed as follows:

$$\rho_q^P = \rho_{his}^{min} + n_q^P \rho_{his}^{bin};$$

Mean density, denoted as $\rho_q^m$, is computed as follows:

$$\rho_q^m = \frac{\sum_{n=0}^{n_q^e - n_q^s} (\rho_{his}^{min} + (n+n_q^s)\rho_{his}^{bin}) S_q(n)}{N_q^O};$$

Density standard deviation, denoted as $\sigma_q^\rho$, is computed as follows:

$$\sigma_q^\rho = \sqrt{\frac{\sum_{n=0}^{n_q^e - n_q^s} (\rho_{his}^{min} + (n+n_q^s)\rho_{his}^{bin} - \rho_q^m)^2 S_q(n)}{N_q^O}};$$

Mass, denoted as $M_q$, is computed as follows:

$$M_q = c_0 \rho_q^m N_q^O;$$

where $c_0$ is the volume of a voxel of the CT image.

Skewness, denoted as $s_q$, is computed as follows:

$$s_q = \frac{\sum_{n=0}^{n_q^e - n_q^s} (\rho_{his}^{min} + (n+n_q^s)\rho_{his}^{bin} - \rho_q^m)^3 S_q(n)}{(\sigma_q^\rho)^3 N_q^O};$$

Kurtosis, denoted as $k_q$, is computed as follows:

$$k_q = \frac{\sum_{n=0}^{n_q^e - n_q^s} (\rho_{his}^{min} + (n+n_q^s)\rho_{his}^{bin} - \rho_q^m)^4 S_q(n)}{(\sigma_q^\rho)^4 N_q^O};$$

Segment width, denoted as $w_i$, is computed as follows:

$$w_q = n_q^e - n_q^s + 1;$$

Mean atomic number, denoted as $Z_q$, is computed as follows:

$$Z_p = \frac{1}{N_q^O} \sum_{(i,j,k) \in O_q} Z(i,j,k);$$

Z standard deviation, denoted as $\sigma_q^z$, is computed as follows:

$$\sigma_q^z = \sqrt{\frac{1}{N_q^O} \sum_{(i,j,k) \in O_q} (Z(i,j,k) - Z_q)^2}.$$

In the further discrimination step 450 in connection to FIG. 6, a potential bulk threat object with more than one and less than five density histogram segments is classified into a threat object or a non-threat object using the features computed from each segment of the density histogram. A potential bulk threat object with one density histogram segment or with more than five density histogram segments is classified as a threat object without further processing. The potential bulk threat object with more than one density histogram segments is classified as a threat object when all of the followings are satisfied:

Peak density $\rho_q^P$ is within a range ($\rho_q^{P\ min}, \rho_q^{P\ max}$)
Mean density $\rho_q^m$ is within a range ($\rho_q^{m\ min}, \rho_q^{m\ max}$)
Density standard deviation $\sigma_q^\rho$ is within a range ($\sigma_q^{\rho\ min}, \sigma_q^{\rho\ max}$)
Mass $M_q$ is within a range ($M_q^{min}, M_q^{max}$)
Skewness $s_q$ is within a range ($s_q^{min}, s_q^{max}$)
Kurtosis $k_q$ is within a range ($k_q^{min}, k_q^{max}$)
Segment width $w_q$ is within a range ($w_q^{min}, w_q^{max}$)
Mean atomic number $Z_q$ is within a range ($Z_q^{min}, Z_q^{max}$)
Z standard deviation $\sigma_q^z$ is within a range ($\sigma_q^{z\ min}, \sigma_q^{z\ max}$)

where $0 \leq q \leq N_p-1$, and $2 \leq N_p \leq 5$.

The parameters ($\rho_q^{P\ min}, \rho_q^{P\ max}$), ($\rho_q^{m\ min}, \rho_q^{m\ max}$), ($\sigma_q^{\rho\ min}, \sigma_q^{\rho\ max}$), ($M_q^{min}, M_q^{max}$), ($s_q^{min}, s_q^{max}$), ($k_q^{min}, k_q^{max}$), ($w_q^{min}, w_q^{max}$), ($Z_q^{min}, Z_q^{max}$), and ($\sigma_q^{z\ min}, \sigma_q^{z\ max}$) are experimentally determined to yield certain detection performance including the probability of detection and probability of false alarm. These parameters can be dependent on the specific type of explosive, and can also be dependent on the total mass of explosive, such as the method described in "Apparatus and Method for Classifying Objects in Computed Tomography Data Using Density Dependent Mass Thresholds," invented by Ibrahim M. Bechwati, et. al. U.S. Pat. No. 6,076,400, issued on Jun. 20, 2000, incorporated herein by reference. The discrimination can also be performed in the joint feature space of the above listed features using support vector machines, as described by Christopher J. C. Burges in "A tutorial on support vector machines for pattern recognition," Data Mining and Knowledge Discovery, Volume 2, Issue 2, June 1998, pp. 121-167, incorporated herein by reference, for training to obtain discrimination boundary.

Referring again to FIG. 6, the shield detection process 309 searches the projection images for clusters of pixels in the density range of interest, and can label them as shield objects. Projection images are 2D images. Each pixel represents the integral of the object x-ray attenuation along the beam path. The inputs to the shield detection method 309 include data from 2D projection images 307. In one particular embodiment of the present disclosure, data from two projection images, of which the projection angles are 90 degrees apart in gantry angle, are used. Let $P_0(i, j)$ be the first projection image, and $P_1(i,j)$ be the second projection image. The size of both projection images is I×J pixels.

Figure 7:
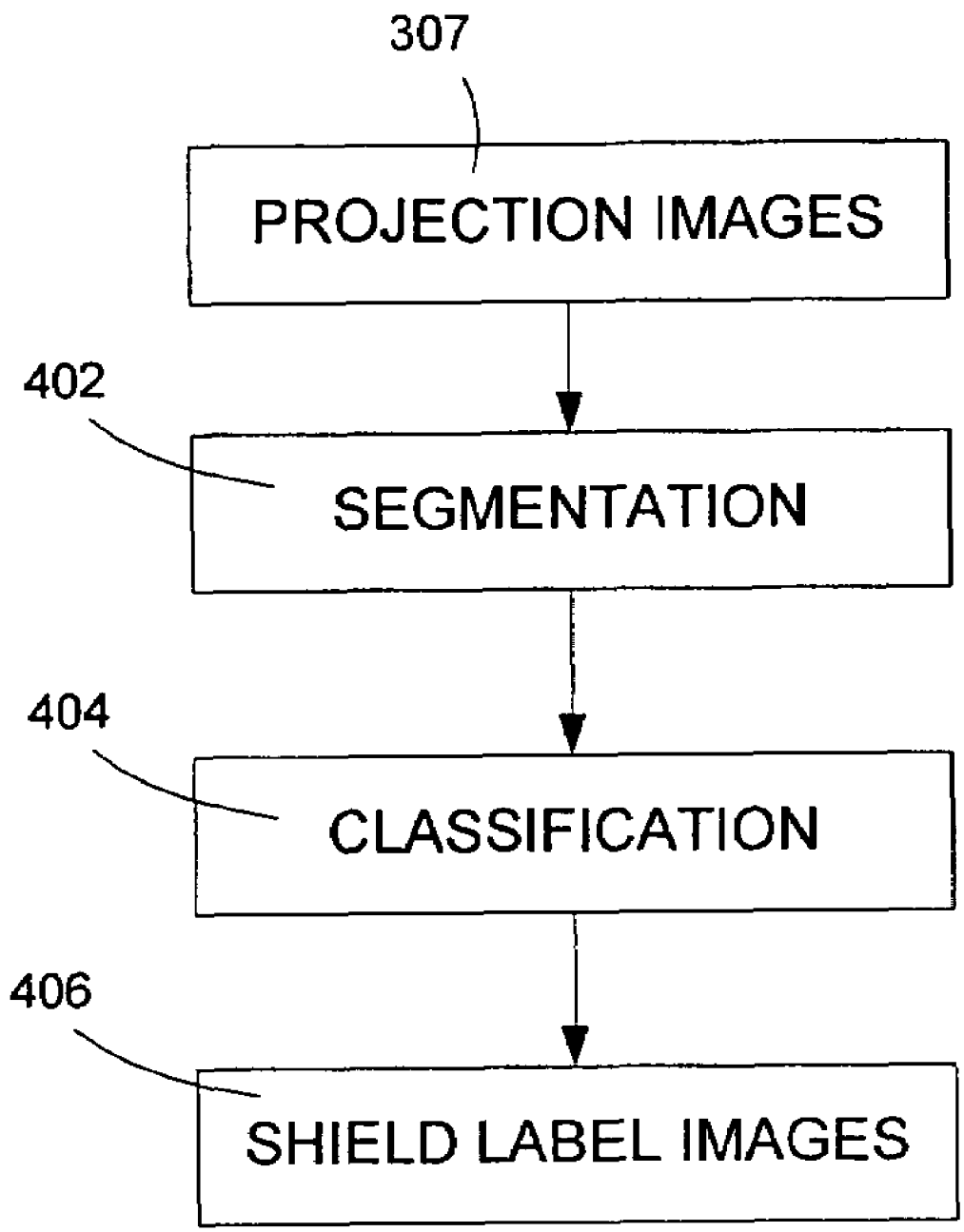
FIG. 7 contains a flow diagram of the logical flow of one embodiment of a shield detection method in accordance with the present disclosure.

FIG. 7 is a schematic flow diagram which illustrates the logical flow of one embodiment of the shield detection method of the disclosure. The segmentation step 402 uses 2D CCL data from image 307, as described in A. Rosenfeld and J. L Pfaltz, "Sequential operations in digital processing," JACM, vol. 13, pp. 471-494, 1966, to segment each of the projection images in attenuation range of interest for shield detection. The resulting label images are denoted as $L_{P0}(i, j)$ and $L_{P1}(i, j)$.

In Step 404 of FIG. 7, the mean attenuation μl and the number of pixels A for each segmented object are computed for classification. A shield is classified if both the mean attenuation μl is greater than an attenuation threshold and the number of pixels A is greater than an area threshold. The thresholds are empirically chosen through analysis of numerous scanned data sets.

Given the bulk, sheet, and shield detection results, the last step, as illustrated at step 310 in FIG. 6, is fusing these results into the desired format for operators to interpret.

In one embodiment, the fusion between the bulk label image $L_b(i, j, k)$ and sheet label image, $L_s(i, j, k)$, can be performed to yield an output label image, $L(i, j, k)$, as follows.

$$L(i, j, k)=L_s(i, j, k)N_b+L_b(i, j, k)$$

where $N_b$ is the number of bulk threats. The output label is essentially a two-dimensional array with sheet label as row index and the bulk label as column index. This allows the voxels occupied by both a bulk threat and a sheet threat to be output for display.

While this disclosure has been particularly shown and described with references to preferred embodiments thereof, it will be understood by those skilled in the art that various changes in form and detail may be made therein without departing from the spirit and scope of the disclosure as defined by the following claims. Such variations include applying the histogram segment features to the sheet path for further discrimination.

The invention claimed is:

1. A method of classifying objects using volumetric multi-energy CT image data, wherein data from CT and Z (atomic number) images including data from at least one segmented potential threat object are provided, comprising:

A. Computing a density histogram for the potential threat object using the CT image data;
B. Dividing the density histogram of the potential threat object data into one or more segments;
C. Computing the histogram segment features for each segment using the CT and Z image data;
D. Classifying each potential threat object into a threat or a non-threat using the computed histogram segment features.

2. The method of claim 1, wherein Step B includes applying a low-pass filter to the density histogram.

3. The method of claim 1, wherein Step B includes identifying peaks in the density histogram.

4. The method of claim 1, wherein Step B includes identifying a starting point of each segment in the density histogram.

5. The method of claim 1, wherein Step B includes identifying an ending point of each segment in the density histogram.

6. The method of claim 3, wherein Step B includes assigning a segment to each identified peak in the density histogram.

7. The method of claim 1, wherein Step C includes computing the mean density for each segment.

8. The method of claim 1, wherein Step C includes computing the peak density for each segment.

9. The method of claim 1, wherein Step C includes computing the density standard deviation for each segment.

10. The method of claim 1, wherein Step C includes computing the width for each segment.

11. The method of claim 1, wherein Step C includes computing the skewness for each segment.

12. The method of claim 1, wherein Step C includes computing the kurtosis for each segment.

13. The method of claim 1, wherein Step C includes computing the mean atomic number for each segment.

14. The method of claim 1, wherein Step C includes computing the Z standard deviation for each segment.

15. A system for classifying objects using data from volumetric multi-energy CT images, wherein data from CT image and Z (atomic number) images including at least one segmented potential threat object are provided, comprising:

A. A module arranged and configured so as to compute a density histogram for the potential threat object using CT image data;
B. A module arranged and configured so as to divide the density histogram of potential threat object into one or more segments;
C. A module arranged and configured so as to compute the histogram segment features for each segment using the CT and Z image data;
D. A module arranged and configured so as to classify the potential threat object into a threat or a non-threat using the computed histogram segment features.

16. The system of claim 15, wherein Module B includes a unit arranged and configured so as to apply a low-pass filter to the density histogram.

17. The system of claim 15, wherein Module B includes a unit arranged and configured so as to identify peaks in the density histogram.

18. The system of claim 15, wherein Module B includes a unit arranged and configured so as to identify a starting point of each segment in the density histogram.

19. The system of claim 15, wherein Module B includes a unit arranged and configured so as to identify an ending point of each segment in the density histogram.

20. The system of claim 15, wherein Module B includes a unit arranged and configured so as to assign a segment to each identified peak in the density histogram.

21. The system of claim 15, wherein Module C includes a unit arranged and configured so as to compute the mean density for each segment.

22. The system of claim 15, wherein Module C includes a unit arranged and configured so as to compute the peak density for each segment.

23. The system of claim 15, wherein Module C includes a unit arranged and configured so as to compute the density standard deviation for each segment.

24. The system of claim 15, wherein Module C includes a unit arranged and configured so as to compute the width for each segment.

25. The system of claim 15, wherein Module C includes a unit arranged and configured so as to compute the skewness for each segment.

26. The system of claim 15, wherein Module C includes a unit arranged and configured so as to compute the kurtosis for each segment.

27. The system of claim 15, wherein Module C includes a unit arranged and configured so as to compute the mean atomic number for each segment.

28. The system of claim 15, wherein Module C includes a unit arranged and configured so as to compute the Z standard deviation for each segment.

* * * * *